Figure 1:
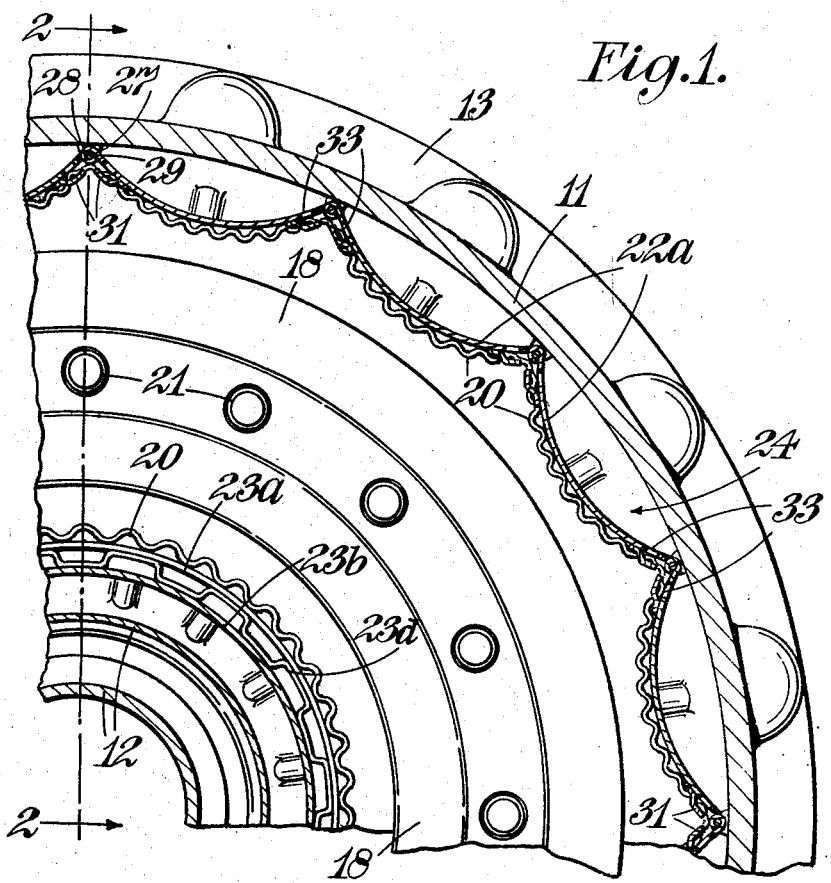

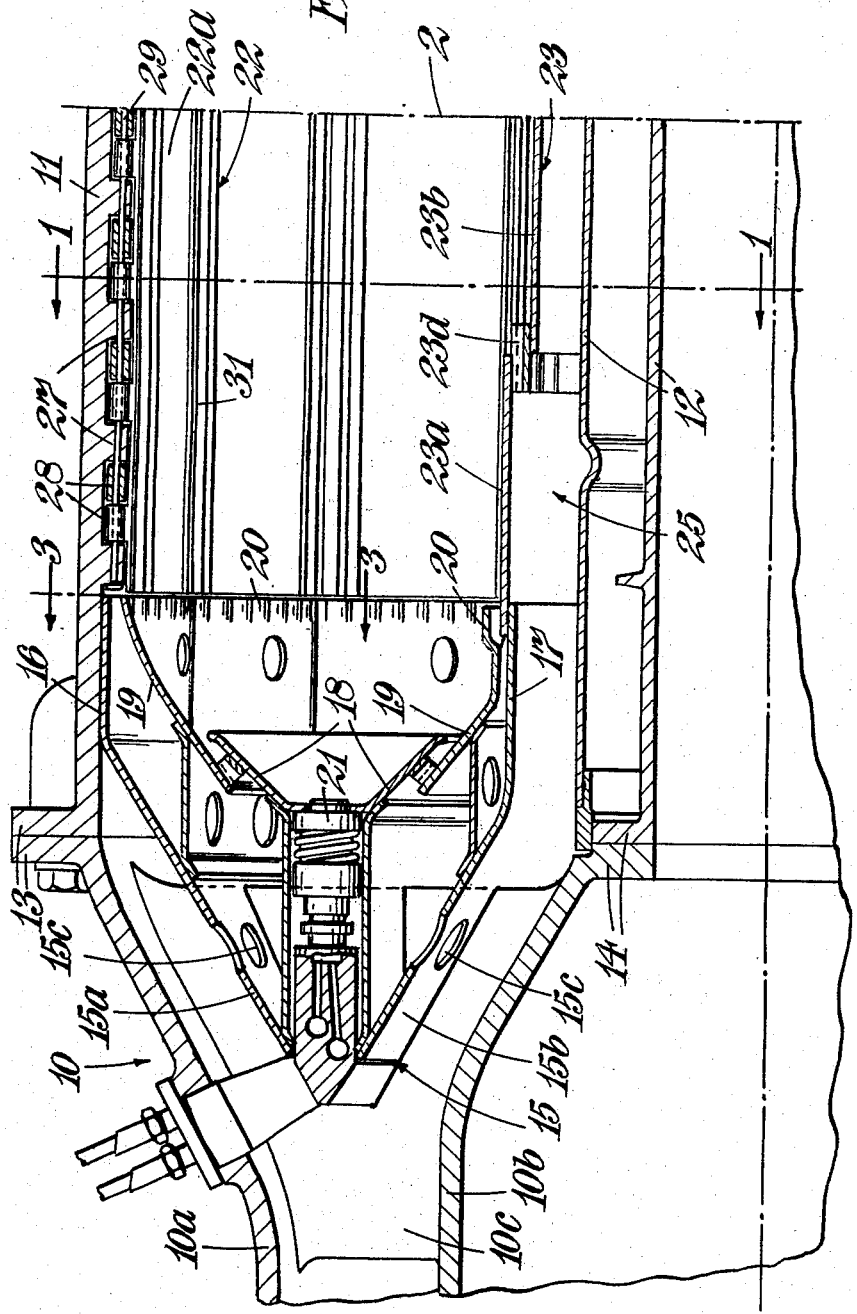

United States Patent Office 2,913,873
Patented Nov. 24, 1959

2,913,873
GAS TURBINE COMBUSTION EQUIPMENT CONSTRUCTION

Frederick Reginald Murray, Newstead Abbey, Linby, England, assignor to Rolls-Royce Limited, Derby, England, a British company Application January 9, 1956, Serial No. 558,122

Claims priority, application Great Britain January 10, 1955

6 Claims. (Cl. 60—39.69)

This invention relates to combustion equipment, such as is used, for example, in gas-turbine engines.

Such combination equipment, as used in gas-turbine engines, normally includes a tubular flame tube wall of generally cylindrical or frusto-conical form which is subjected externally to a pressure higher than the pressure inside it so that the wall is in compression. This is undesirable, especially as the wall is also subjected to high temperatures in operation.

This invention has for an object to enable the loading of such a wall in compression to be avoided.

According to the present invention, in combustion equipment having a pair of tubular walls arranged one within the other to define a pressure space between them, and to define a combustion space within the inner wall, the pressure in which pressure space between the walls in operation of the combustion equipment is greater than the pressures inside the inner wall and outside the outer wall, the inner wall is made in a plurality of wall sections each affording part of the periphery of the inner wall, the wall sections being arranged side-by-side in a circumferential assembly together to form the complete tubular wall, and the wall sections are connected to the outer wall through pin joint means extending along their circumferentially-spaced edges, the number and cross-section of the wall sections being such that they are loaded in tension. The invention is primarily, though not exclusively, applicable to combustion equipment for gas-turbine engines. It may also, for example, be applied to ramjets.

The term "pin joint means" is intended to include a joint which is flexible enough to be virtually a pin joint.

The minimum number of wall sections in constructions according to the invention will be in the region of eight, but preferably the number of wall sections is larger, say 14 or 16, and each wall section is preferably of arcuate cross-section at right angles to the axis of the combustion equipment, the concave side facing outward.

The invention has an important use in gas turbine engines employing fully annular combustion equipment, particularly where the engine is of a large diameter. Such combustion equipment usually has an outer air casing wall and within it an adjacent outer flame tube wall, and also an inner flame tube wall and within it an inner air casing wall, and the pressure between each of the air casing walls and its associated flame tube wall is higher than the pressure on the other side of the respective walls, and the invention may be applied to either of these pairs of walls. The walls are usually concentric. The construction according to the invention is especially suitable for the large-diameter, hot, outer flame-tube wall.

In one preferred arrangement, the outer flame-tube wall of annular combustion equipment is made as an annular assembly of like sections each of which is of arcuate cross-section with the convex surface directed inwardly, and each pair of adjacent circumferentially-spaced edges of the sections are secured directly to the annular, outer air-casing wall by an axially-extending hinge pin engaging axially-aligned hinge pieces on the air casing and on said adjacent edges of the wall sections.

In another preferred arrangement each pair of circumferentally-spaced edges of the wall sections forming the flame tube wall is secured by a hinge pin engaging aligned hinge pieces on the edges of the wall sections and on one edge of a strip running along the edges, and the other edge of the strip is mounted directly on the outer air-casing wall by a pin running through hinge pieces on the air-casing wall and on said other edge of the strip.

To protect the pin joints against overheating, the wall sections may have a Z-section strip welded to them adjacent the joint by one of its flanges, and the other flange may project towards the joint, the sections having a row of drilled holes through which air flows to impinge on the latter flange and thus to be directed over the joint.

In yet another arrangement, the adjacent edges of the wall sections forming the flame-tube wall are formed with spaced tabs, the tabs on one edge projecting between those on the adjacent edge and the tabs being secured at their outer ends to the air-casing wall.

Figure 3:
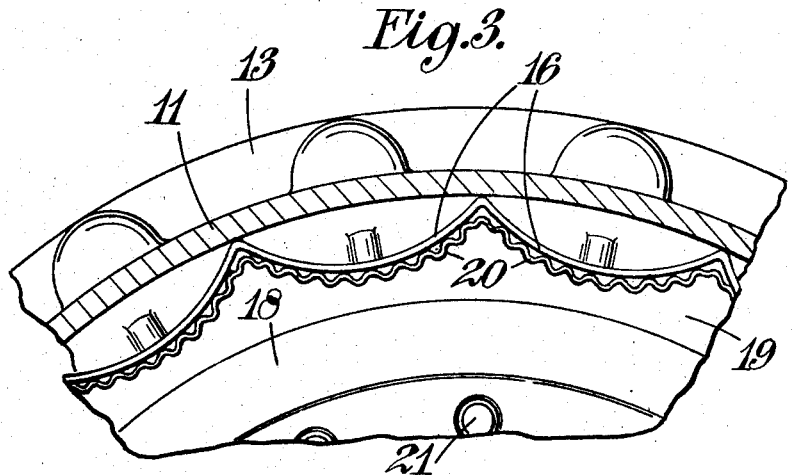
Figure 2B:
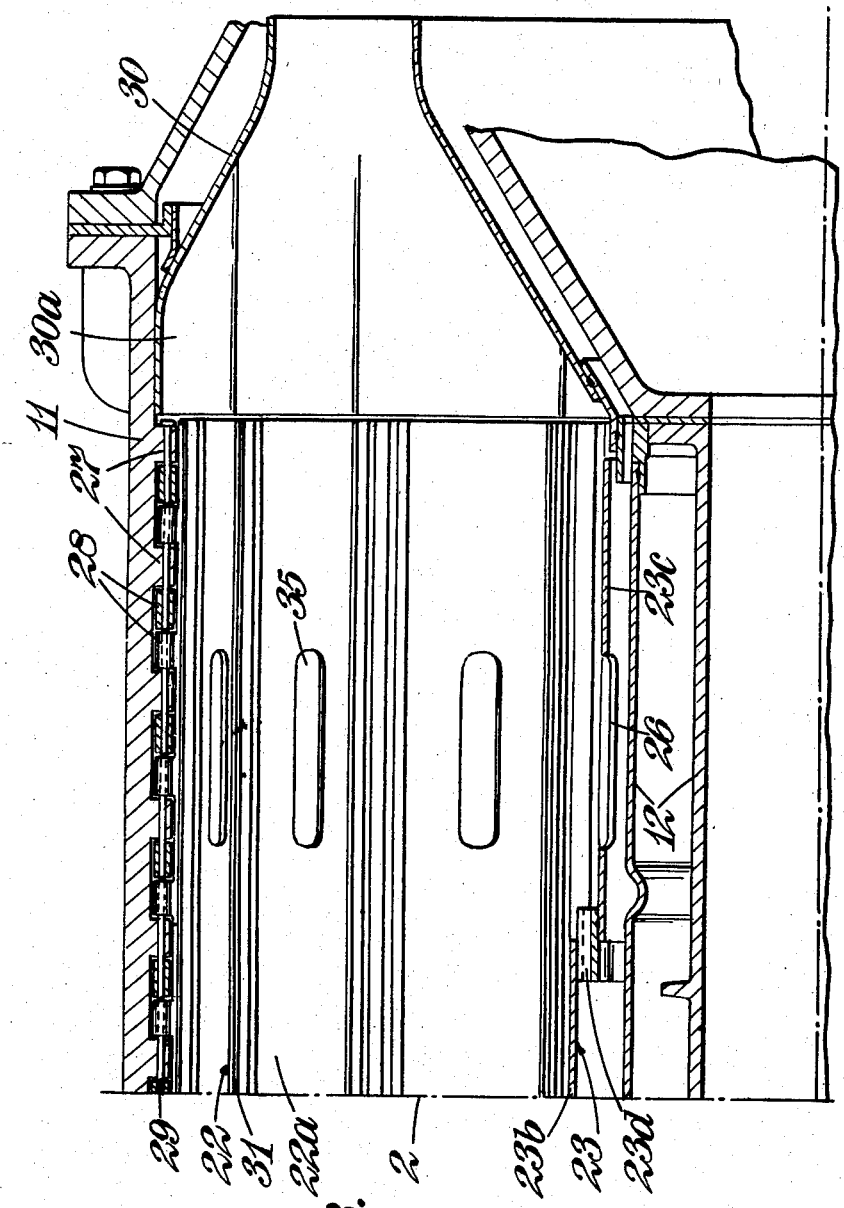
Figure 4:
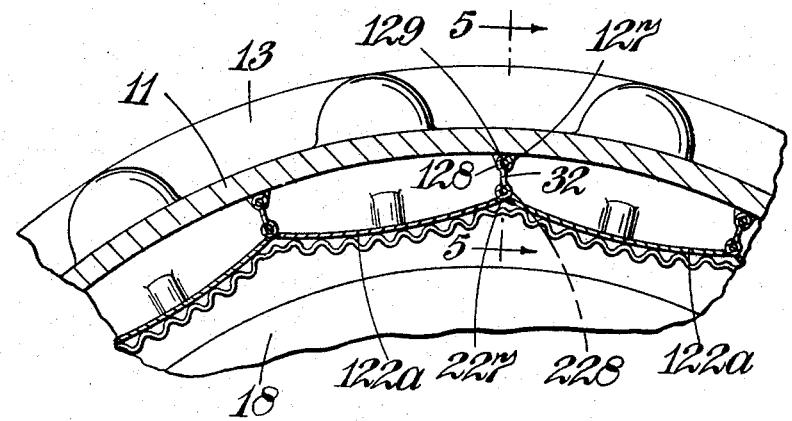
Figure 5:
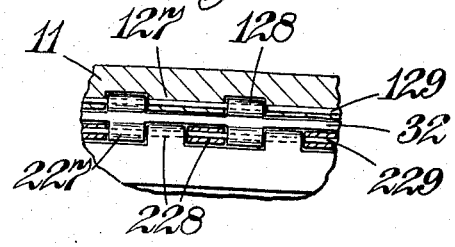

Some embodiments of this invention will now be described with reference to the accompanying drawings, in which:

Figure 1 is a cross-section through one embodiment of combustion equipment of this invention, Figures 2A and 2B are adjacent parts of a section on the line 2—2 of Figure 1, the parts being joined at the chain line 2 in each figure, and the section line for Figure 1 being indicated at 1—1 in Figure 2A, Figure 3 is a section on the line 3—3 of Figure 2A, Figure 4 is a view corresponding to Figure 1 of a second embodiment, and Figure 5 is a section on the line 5—5 of Figure 4.

Referring to Figures 1 to 3, there is illustrated gas-turbine engine combustion equipment of the fully annular kind to which the invention is applied.

The combustion equipment comprises an air casing and, within the air casing, a flame tube structure which forms the boundary of the actual combustion space.

The air casing comprises an air inlet or diffuser section 10, a main outer cylindrical wall 11, and a main inner cylindrical wall structure 12. The diffuser section 10 comprises an outer frusto-conical wall 10a to which the main outer wall 11 is secured over bolting flanges 13, an inner frusto-conical wall 10b which is coaxially within the outer wall 10a and has the main inner wall structure 12 secured thereto over flanges 14, and struts 10c joining the walls 10a, 10b.

The flame tube comprises a primary combustion air inlet section 15, a main outer flame tube wall structure 22, and a main inner flame tube wall structure 23.

The primary air inlet section 15 has outer and inner annular walls 15a, 15b substantially parallel to but spaced from the walls 10a, 10b so that the air entering the diffuser section 10 is divided into two streams, one passing radially outside the inlet section 15 and one passing radially inside the inlet section. Each wall 15a, 15b has a downstream flange 16, 17 of which the flange 16 is of looped form (as seen in Figure 3), and flange 17 is cylindrical. The inlet section 15 also comprises an internal wall structure including spaced flared walls 18, 19 and some air flows into the section through holes 15c in the walls 15a, 15b and out from the section through the gaps between the walls 18, 19 and also along corrugations 20 at the downstream edges of the flared walls 19.

A ring of fuel injectors 21 are supported from the wall 10a of the diffuser section 10 to be within the inlet section 15 of the flame tube.

The stream of air flowing between the diffuser wall 10b and the flame tube inlet section wall 15b passes into the space 25 between the main inner flame tube wall 23 and the inner air casing wall structure 12, and the stream of air flowing between walls 15a, 10a passes into the spaces 24 between the main outer air casing wall 11 and the outer flame tube wall structure 22, and the air from both spaces 24 and 25 then flows into the combustion space.

It will be appreciated that there is a fall of pressure across the flame tube walls and we have found that it is desirable to ensure that these walls are in tension rather than in compression.

Since the inner flame tube wall 23 is internally loaded by the pressure air it will be in tension and therefore may be of conventional construction as shown, comprising a number of cylindrical sections 23a, 23b, 23c of gradually decreasing diameter joined at their adjacent ends by corrugated strips 23d which provide inlets through which part of the air flowing in the space 25 enters the combustion space. The remainder of the air flows into the combustion space through large apertures 26 in the flame tube section 23c.

However, since the higher pressure to which the outer flame tube wall structure 22 is subjected acts on the outside of the structure, it is necessary to provide a form of wall structure which differs from the conventional cylindrical or frusto-conical structure hitherto proposed and employed, thereby to avoid subjection of the outer flame tube wall structure 22 to compression loads.

One suitable form of wall structure is shown in Figures 1 to 3 and in this construction the outer flame tube wall structure 22 comprises a large number, say sixteen, of arcuate-section wall elements 22a which are disposed with their concave surfaces facing outwardly and their convex surfaces facing the combustion space. The sections 22a are supported by pin joints at their circumferentially-spaced edges from the main outer air casing wall 11. It will thus be seen that instead of the wall sections 22a being in compression they will be in tension. The wall sections are formed with large holes 35 through which the bulk of the air flowing in spaces 24 enters the combustion space.

The pin joint comprises a series of axially-spaced hinge pieces 27 projecting from the inner surface of the outer air casing wall 11 and corresponding hinge pieces 28 formed on the adjacent edges of the wall sections 22a, and a hinge pin 29 extending through the axially-aligned hinge pieces 27 and 28 to attach the wall sections 22a to the outer air casing wall 11.

It will be seen from Figure 1 that the spaces 24 are each of lenticular cross-section and in order to distribute the air flowing in the space between the walls 15a, 10a into the spaces 24, the downstream flange 16 of the wall 15a and the adjacent edge of the flared wall 19 of the inlet section are correspondingly shaped as will be seen from Figure 3. Part of the air flowing in the spaces 24 is employed to cool the outer wall 30 of the annular nozzle leading to the turbine (not shown) from the downstream end of the combustion equipment, and so that the air may flow outside the wall 30, it is shaped (as indicated at 30a), at its upstream end at least, in a manner similar to the flange 16.

In order to protect the pin joints 27, 28, 29 against overheating, Z-section strips 31 are welded to the inner surfaces of the wall sections 22a adjacent their edges so that one flange of the Z-section is attached to the wall section and the other flange projects towards the pin joint. Holes 33 are formed in the wall sections to allow air to flow from the spaces 24 to between the Z-section strips and the inner surfaces of the wall sections 22a and this air is directed by the Z-section strips 31 on to the pin joints. The free edges of the Z-section strips are slightly spaced apart to allow this air to flow out into the combustion space.

Referring now to Figures 4 and 5, there is illustrated a modified construction of pin joint. In this construction the outer flame tube wall structure is again formed by a plurality of wall sections 122a of arcuate section disposed with their convex surfaces facing the combustion space. The adjacent circumferentially-spaced edges of the wall sections 122a are connected to the outer air casing wall 11 by strips 32 which are mounted on the outer air casing wall each by a first pin joint and which are connected to the wall sections 122a by a second pin joint.

The first pin joint comprises axially-spaced hinge pieces 127 projecting from the internal surface of the outer air casing wall 11 and corresponding hinge pieces 128 formed on the radially outer edges of the strips 32, these parts being engaged by an axially-extending hinge pin 129. The second pin joint comprises hinge pieces 227 on the radially inner edge of the strips 32, corresponding hinge pieces 228 on the adjacent edges of each pair of wall sections 122a and a hinge pin 229 running through the hinge pieces 227, 228. The pin joint 227, 228, 229 may if desired be protected against overheating in a manner similar to that shown in Figures 1 and 2 for the pin joint 27, 28, 29.

With the above novel constructions the wall sections are placed in tension, so that they are essentially stable, and thus a lighter construction may be used for a desired strength of the wall.

I claim:

1. Main combustion equipment for a gas-turbine engine, which combustion equipment is of the fully annular kind and comprises an outer tubular air casing wall and a tubular flame tube wall arranged coaxially within the air casing wall, said walls defining a pressure space between them, and said flame tube wall defining within it a combustion space, the pressure in which pressure space between the walls in operation of the combustion equipment is greater than the pressure inside the flame tube wall and outside the air casing wall, and wherein the flame tube wall is made in a plurality of axially-extending wall sections each affording part of the periphery of the flame tube wall, each wall section having a pair of circumferentially-spaced axially-extending edges and the wall sections being arranged in a circumferential assembly with their edges side by side to form a complete tubular wall, and hinge pins extending along and pivotally engaging said edges, said hinge pins being mounted on the air casing wall and pivotally connecting each of the wall sections by its edges to the air casing wall, the number and cross-section of the wall sections being such that they are loaded in tension.

2. Combustion equipment as claimed in claim 1, wherein the wall sections are of arcuate cross-section and have their convex sides facing the combustion space and their concave sides facing the pressure space, and wherein each pair of adjacent circumferentially-spaced edges of the wall sections and the air casing wall have aligned hinge pieces receiving one of said hinge pins, whereby the wall sections are pivotally attached directly to the air casing wall.

3. Combustion equipment as claimed in claim 1, comprising adjacent each adjacent pair of circumferentially-spaced edges of the wall sections a strip with an edge extending axially along said pair of edges, the edges having aligned hinge pieces engaged by one of said hinge pins whereby the wall sections are pivotally attached to the strip, the strip having a second edge adjacent the air casing wall, aligned hinge pieces on said second edge and on the air casing walls and a further hinge pin running through said hinge pieces on the second edge of the strip and on the air casing wall whereby the strip is pivotally attached to the air casing wall.

4. Combustion equipment as claimed in claim 1, wherein there are about fourteen wall sections.

5. Combustion equipment as claimed in claim 1, wherein each wall section is of arcuate cross-section at right angles to the axis of the combustion equipment, the concave side facing outward, and the convex side facing inwardly.

6. Gas turbine combustion equipment comprising an outer annular wall and an inner wall structure defining with said outer wall a pressure receiving space, said inner wall structure defining within it a combustion space wherein the pressure is lower than in the space between the outer wall and the inner wall structure, said inner wall structure comprising a multiplicity of wall sections arranged side by side in annular assembly together to form a complete tubular wall, each said wall section extending axially of said outer annular wall and being curved in cross section in planes at right angles to the axis of said outer annular wall so as to have a convex face and a concave face, the convex face facing the combustion space and the concave face facing the pressure air space, and each said wall section having a pair of circumferentially spaced edges, and pin joint means extending along the circumferentially spaced edges of each wall section and connecting said wall section to the outer annular wall.

References Cited in the file of this patent

UNITED STATES PATENTS

| | | |
|---|---|---|
| 2,268,464 | Seippel | Dec. 30, 1941 |
| 2,544,538 | Mahnken et al. | Mar. 6, 1951 |
| 2,794,319 | Stockdale | June 4, 1957 |